(12) United States Patent
Lu et al.

(10) Patent No.: US 10,938,726 B2
(45) Date of Patent: Mar. 2, 2021

(54) INTERNET PROTOCOL FLOW DATA INCLUDING FIREWALL RULES

(71) Applicant: Nicira, Inc., Palo Alto, CA (US)

(72) Inventors: Russell Lu, Pleasanton, CA (US); Xin Qi, San Jose, CA (US); Shadab Shah, Fremont, CA (US); Sunitha Krishna, Palo Alto, CA (US); Yangyang Zhu, San Jose, CA (US); Subrahmanyam Manuguri, San Jose, CA (US); Raju Koganty, San Jose, CA (US)

(73) Assignee: NICIRA, INC., Palo Alto, CA (US)

(\*) Notice: Subject to any disclaimer, the term of this patent is extended or adjusted under 35 U.S.C. 154(b) by 123 days.

(21) Appl. No.: 15/697,409

(22) Filed: Sep. 6, 2017

(65) Prior Publication Data

US 2019/0075056 A1 Mar. 7, 2019

(51) Int. Cl.
*H04L 12/851* (2013.01)
*H04L 29/06* (2006.01)
*H04L 12/26* (2006.01)

(52) U.S. Cl.
CPC ........ *H04L 47/2441* (2013.01); *H04L 43/026* (2013.01); *H04L 43/045* (2013.01); *H04L 43/12* (2013.01); *H04L 63/0263* (2013.01); *H04L 63/1425* (2013.01); *H04L 43/14* (2013.01)

(58) Field of Classification Search
CPC ............. H04L 47/2441; H04L 63/0263; H04L 43/045; H04L 63/1425; H04L 43/14
USPC ......................................................... 709/224
See application file for complete search history.

(56) References Cited

U.S. PATENT DOCUMENTS

2016/0044106 A1\* 2/2016 Kjendal ................ H04L 43/028
                                                                    709/225
2018/0367412 A1\* 12/2018 Sethi ...................... H04L 41/12

\* cited by examiner

*Primary Examiner* — David R Lazaro
*Assistant Examiner* — Zia Khurshid
(74) *Attorney, Agent, or Firm* — Adeli LLP

(57) ABSTRACT

For a network including multiple host machines that together implement at least one logical network including a firewall, some embodiments provide a method for collecting traffic flow data that includes identifiers for firewall rules applied to the traffic flow and a logical entity identifier. In some embodiments, the host machines receive traffic monitoring configuration data for a logical network. The traffic monitoring configuration data in some embodiments indicates a set of logical entities of the logical network for which to collect traffic flow data and a set of traffic flow data collectors associated with the set of logical entities. The indicated logical entities may be logical forwarding elements (logical switches, routers, etc.) or logical ports of logical forwarding elements.

21 Claims, 5 Drawing Sheets

INTERNET PROTOCOL FLOW DATA INCLUDING FIREWALL RULES

BACKGROUND

In a software defined cloud environment, customers define and network their computing systems by creating and managing different networking logical entities, such as logical ports and logical switches. These logical entities provide facility and agility to customers in terms of networking their cloud. However, to allow any logical entity to communicate with all the other logical entities is not secure. Usually, customers have to define and enforce their own security policies in their own cloud. One important aspect of their security policies is to define which logical entities are able to communicate with each other. The most common way for customers to enforce this aspect of their security policies is through defining firewall rules. From the perspective of a security administrator or security operator, it is crucial and helpful to monitor how much traffic and which kind of traffic has hit a specific firewall rule or set of firewall rules. The traditional way for them to do that is to dig into tons of networking related log files, which is extremely tedious work.

Also, traditional cloud managed by an organization only contains one kind of transport node (or hypervisor). However, as the cloud computing and virtualization technologies advance, there is a trend towards clouds becoming heterogeneous and embracing different kinds of transport nodes, such as ESXi™ and kernel-based virtual machine (KVM). VMware's NSX Transformer (NSX-T™) product line follows this trend and aims to provide customers with the ability to create and network heterogeneous software defined clouds. Monitoring how their security policies have been applied becomes even more tedious in such a heterogeneous cloud environment for security administrators or security operators, since they have to face the extra physical complexities brought by different types of transport nodes.

BRIEF SUMMARY

For a network including multiple host machines that together implement at least one logical network in a distributed fashion, some embodiments provide a method for collecting traffic flow data. In some embodiments, the host machines (e.g., local controllers operating in virtualization software of the host machines) receive traffic monitoring configuration data for a logical network that includes a set of logical entities (e.g., logical forwarding elements and their logical ports, logical services such as a distributed firewall, etc.). The traffic monitoring configuration data in some embodiments indicates a set of logical entities of the logical network for which to collect traffic flow data and a set of traffic flow data collectors associated with the set of logical entities (e.g., a specific data collector for each logical entity). In some embodiments, the logical entities specified by the traffic monitoring configuration data may be logical forwarding elements (logical switches, routers, etc.) or logical ports of logical forwarding elements.

To implement the logical network, a set of managed forwarding elements operating on the host machine (e.g., in the virtualization software) processes data messages sent to and from logical network endpoints (e.g., data compute nodes operating on the host machine). When data messages are logically sent to or from the logical entities specified for traffic monitoring, some embodiments collect data about the processed data message. If one or more firewall rules are used to process the data message, the collected data includes data regarding the firewall rule(s). The host machine exports the collected data to the set of traffic flow data collectors for analysis and display. In some embodiments, different logical entities in the set of monitored logical entities are associated with different subsets of the traffic flow data collectors (e.g., each logical entity with a single traffic flow data collector). In some embodiments, the host machine exports the traffic flow data in internet protocol flow information export (IPFIX) format, with the traffic flow data collectors being IPFIX collectors. Other embodiments use other formatting for exporting the traffic flow data.

In some embodiments, the managed forwarding elements host machines implement multiple logical networks, with at least a subset of the logical networks having its own set of logical entities for which traffic flow data is collected and associated with different traffic flow data collectors. As mentioned, the managed forwarding elements (and local controllers) of some embodiments operate in the virtualization software of the host machines. Some embodiments have multiple types of virtualization software (e.g. ESXi™, Hyper-V™, kernel-based virtual machine (KVM), etc.) operating on different host machines.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 1:
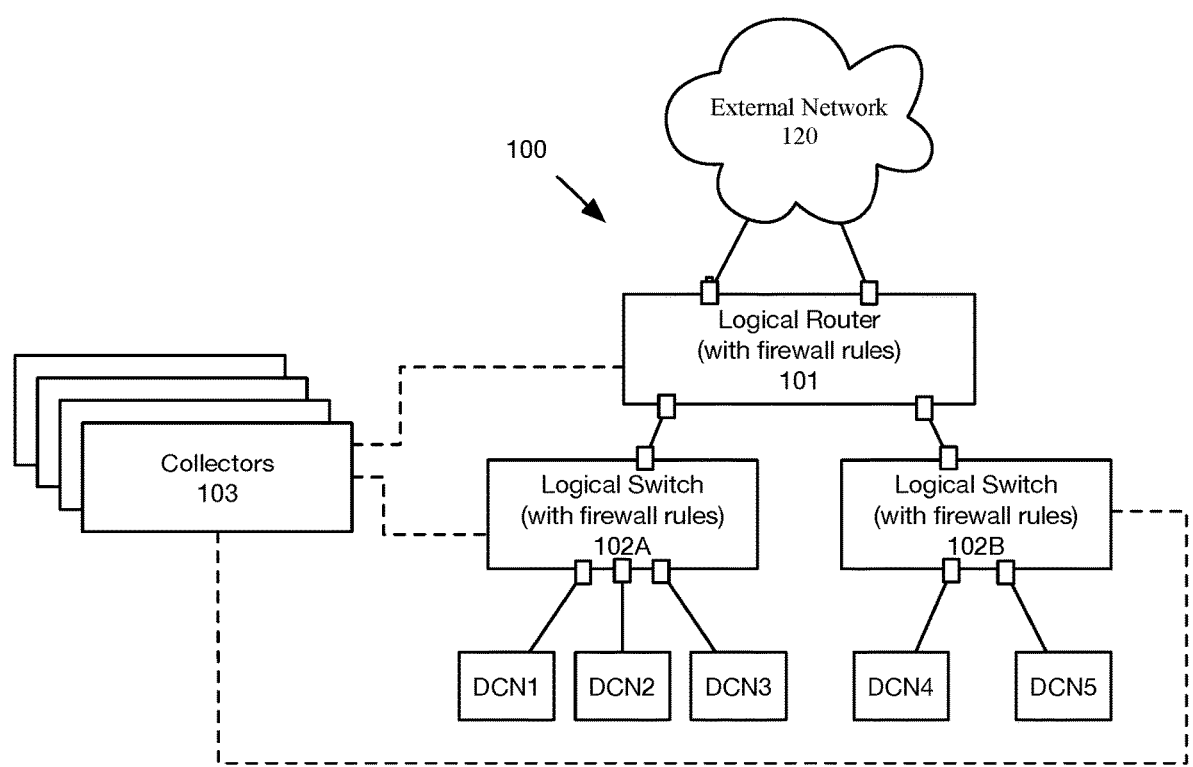
FIG. 1 conceptually illustrates a configuration view of a user-defined logical network.
Figure 2:
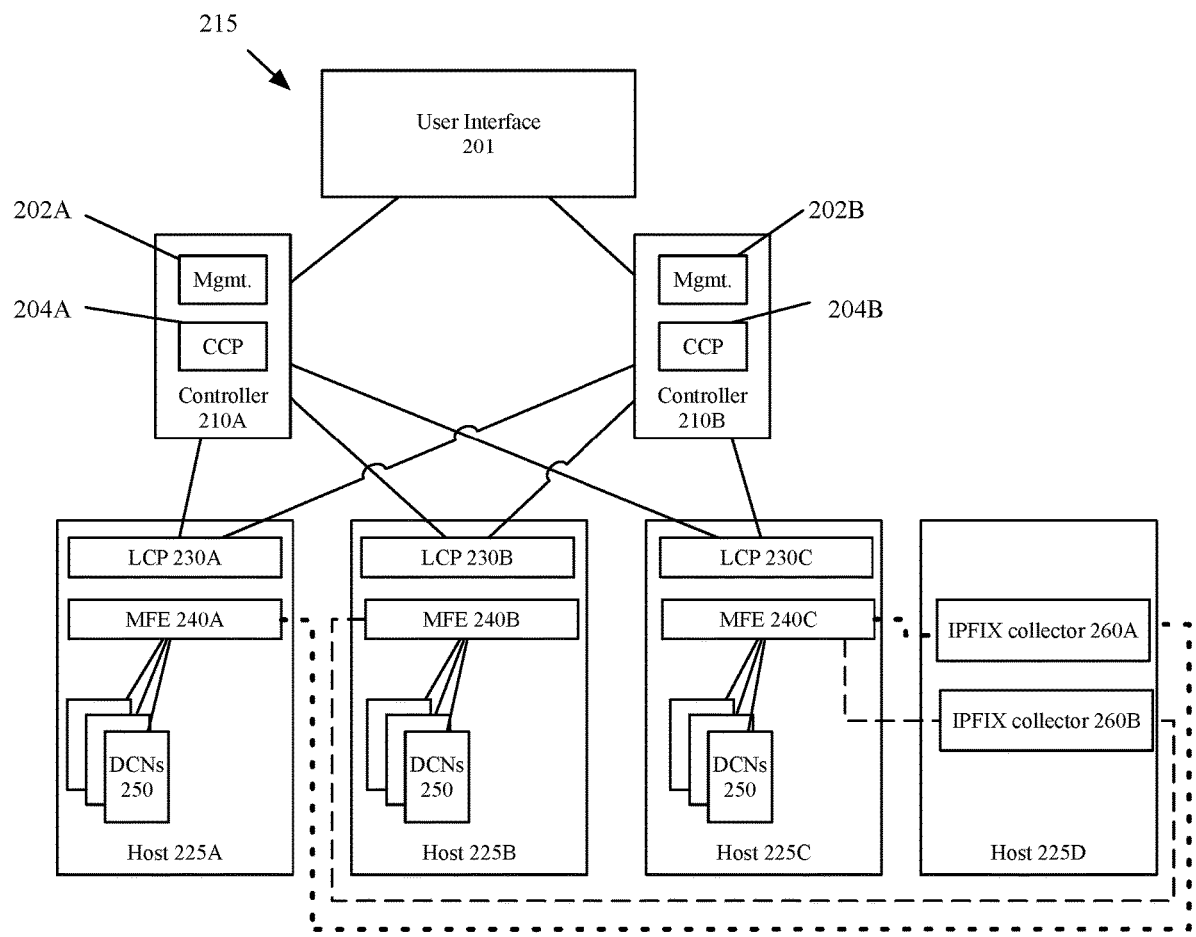
FIG. 2 conceptually illustrates a physical system of some embodiments in which the configuration view of the logical network illustrated in FIG. 1 is implemented.

For a network including multiple host machines that together implement at least one logical network including a firewall, some embodiments provide a method for collecting traffic flow data. The host machines receive traffic monitoring configuration data for a logical network, which in some embodiments indicate a set of logical entities of the logical network for which to collect traffic flow data, and a set of traffic flow data collectors associated with the set of logical entities. The indicated logical entities may be logical forwarding elements (e.g. logical switches, routers, etc.) or logical ports of logical forwarding elements. FIGS. 1 and 2 illustrate configuration and physical views of an exemplary network of some embodiments.

FIG. 1 illustrates a configuration view of a user-defined logical network. A user-defined logical network as used in this application, refers to a particular logical abstraction of a network. In some embodiments, the logical abstraction includes logical counterparts to network elements of a physical network such as switches, hubs, routers, bridges, ports, load balancers, firewalls, etc. The logical forwarding elements (e.g., a logical switch or logical router) in some embodiments are implemented by a set of MFEs (e.g., physical or virtual/software switches, or routers) executing on a set of host machines. A particular host machine may host data compute nodes connected to multiple different logical networks and at least one MFE that implements all the logical networks to which the DCNs logically connect.

Configuration view 100 represents a logical network as designed by a user. As shown, a logical router 101 is part of the logical network 100 that includes the logical router 101 and two logical switches 102A and 102B. Each logical forwarding element (i.e., logical router 101 and logical switches 102) includes firewall rules applied at the forwarding element. The two logical switches 102A and 102B each have DCNs that connect to logical ports. In some embodiments, the logical switches are virtual local area networks identified by virtual network identifiers (VNIs). It should be understood that the DCNs in some embodiments are, for example, virtual machines, containers, etc. The logical router 101 also includes two ports that connect to an external physical network 120. While shown with only one logical router, two logical switches, and five DCNs in the logical network, the logical network may include any number of logical routers, switches, and DCNs. In some embodiments, logical router 101 may also be configured by a user to provide network services (e.g., load balancing, network address translation, etc.).

Each logical forwarding element is depicted as logically connecting to a set of collectors 103. The set of collectors 103 collect traffic flow data from logical forwarding elements. In some embodiments, individual collectors in the set of collectors 103 are associated with particular logical forwarding elements or logical ports of the logical forwarding elements. Associating particular collectors with particular logical forwarding elements can be done to balance a load among the set of collectors. Associating particular collectors with (1) sets of flows, for example by assigning ranges of values of a hash of flow identifiers, or (2) sets of firewall rules, for example firewall rules reciting a particular logical entity, are used in some embodiments to balance the load among the collectors.

Logical routers (LRs) can be implemented in either a distributed manner (e.g., with the logical router processing performed in first-hop MFEs that physically couple directly to the data compute nodes) or a centralized manner (with the logical router processing performed in gateways for both north-south and east-west traffic). For centralized implementations, logical routers may be scaled out by using multiple physical boxes in order to provide additional throughput (e.g., using equal-cost multi-path (ECMP) techniques) as well as for failure protection.

In some embodiments, the logical routers may only use stateful services if implemented at least partially in a centralized (e.g., clustered) manner (to avoid the need for state-sharing between the logical router implementations). In different embodiments, gateways that provide centralized aspects of logical routers, as well as provide connection to the external network for distributed LRs may be implemented as virtual machines (sometimes referred to as Edge VMs), as other types of data compute nodes (e.g., containers), or by using the Linux-based datapath development kit (DPDK) packet processing software (e.g., as a VRF in the DPDK-based datapath).

FIG. 2 conceptually illustrates a set of physical machines 215 of some embodiments implementing the logical structures depicted in FIG. 1. FIG. 2 includes a user interface 201, two separate controllers 210A and 210B that implement management plane modules 202 and central control plane modules 204, and a set of hosts 225 that execute managed forwarding elements (MFEs) 240 and data compute nodes (DCNs) 250. User interface 201 represents an interface at which a user can specify a traffic flow data collection configuration, including identifying logical entities and firewall rules for which traffic flow data is to be collected. Although shown to be collocated, in some embodiments the management and central control plane modules execute on separate host machines. User interface 201 in some embodiments is also used to define a logical network or multiple logical networks and traffic flow data collection configuration for each logical network.

FIG. 2 also illustrates the set of host machines 225A-C hosting the set of managed forwarding elements (MFEs) 240 that implement the logical switches 102A and 102B and, in embodiments for which logical router 101 is a distributed router, the distributed logical router 101, as shown in FIG. 1. The MFEs connect the DCNs executing on the different host machines 225 to the logical network. In some embodiments, the MFEs are configured through a local control plane 230 executing on the host machine 225 that receives configuration data from controllers 210. Host machines 225A-C in some embodiments implement multiple logical networks that connect to different sets of DCNs executing on host machines 225A-C.

DCNs (e.g., VMs, containers, etc.) that couple to one of the logical switches 102A and 102B in the logical network 100 in FIG. 1, operate on a host machine 225. In some embodiments, additional DCNs implemented as physical machines (not shown) also connect to the logical network. The MFEs 240 perform first-hop switching and routing for the logical switches 102A and 102B and, in some embodiments, for the logical router 101. That is, the datapaths (e.g., in the MFEs 240) all include the necessary processing pipelines for the logical switches 102 (and the logical router 101). Each MFE is capable of performing (logical) L2 processing for each logical switch and (logical) L3 processing for distributed routers, and tunneling a data message to another host machine on which a destination DCN in the logical network executes. The logical processing includes applying firewall rules to received data messages. MFEs 240 in some embodiments implement multiple logical forwarding elements for multiple logical networks which may belong to multiple clients (e.g., tenants in a datacenter).

FIG. 2 also includes host 225D which executes internet protocol flow information export (IPFIX) collectors 260 as examples of collectors in the set of collectors 103 in FIG. 1. Host machine 225D in some embodiments is one of multiple hosts implementing or executing a collector. In some embodiments, the host machines hosting collectors are located in a remote location from the other hosts executing the DCNs and MFEs. Host machine 225D is shown hosting multiple collectors, however, the set of host machines implementing the set of collectors 103 may include multiple host machines each implementing any number of collectors that are located in multiple physical locations.

Figure 3:
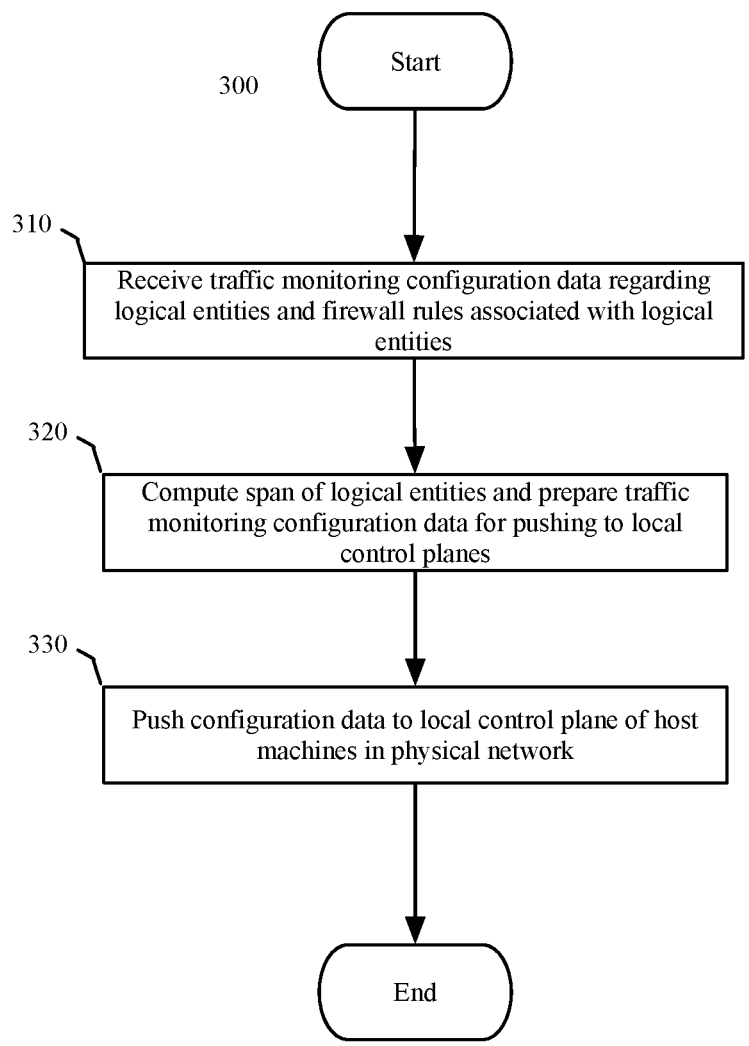
FIG. 3 conceptually illustrates a process of some embodiments for receiving configuration data from a user and pushing it to transport nodes.

In some embodiments, a method is provided for configuring a set of hosts implementing the logical forwarding elements to process data messages to collect traffic flow data and export it to collectors. FIG. 3 conceptually illustrates a process of some embodiments for receiving configuration data from a user and pushing it to transport nodes.

As used in this document, the term data packet, packet, or message refers to a collection of bits in a particular format sent across a network. It should be understood that the term data packet, packet, or message may be used herein to refer to various formatted collections of bits that may be sent across a network, such as Ethernet frames, IP packets, TCP segments, UDP datagrams, etc. While the examples below refer to data packets, packets, or messages, it should be understood that the invention should not be limited to any specific format or type of data message. Also, as used in this document, references to L2, L3, L4, and L7 layers (or layer 2, layer 3, layer 4, layer 7) are references to the second data link layer, the third network layer, the fourth transport layer, and the seventh application layer of the OSI (Open System Interconnection) layer model, respectively.

Traffic flow data in some embodiments is formatted according to the IPFIX protocol. IPFIX is a protocol that was created based on the need for a common, universal standard of export for Internet Protocol flow information from routers, probes and other devices that are used by mediation systems, accounting/billing systems and network management systems to facilitate services such as measurement, accounting and billing. The IPFIX standard defines how IP flow information is to be formatted and transferred from an exporter to a collector. Details of the IPFIX protocol can be found in IETF request for comments (RFC) 7011 through RFC 7015 which are hereby incorporated by reference.

The IPFIX protocol has many implementations in large-scale networked systems. Implementing IPFIX against firewall rules in a heterogeneous software defined cloud in order to ease the life of a security administrator or security operator is discussed below. In some embodiments, the method provides an easy-to-use and easy-to-understand IPFIX tool against firewall rules within VMware's network virtualization product—NSX Transformer (NSX-T™), that supports heterogeneous transport nodes. Using the method eases the process of defining IPFIX firewall configurations and applying them to logical entities, including logical ports and logical switches. In runtime, statistics of traffic hitting the firewall rules that are applied at logical entities specified in an IPFIX firewall configuration are collected. Firewall rules may be organized according to sections that include lists of firewall rules to be applied to different sets of logical entities of a single tenant (e.g., different sections for sales and engineering departments). The statistics are available for further analysis by a security administrator or security operator. For virtualized logical networks with distributed logical forwarding elements, defining the data collection in terms of the logical entities allows a user to ignore the mapping of the logical network to the physical network and focus instead on the user-defined logical network structure when defining the traffic data collection.

FIG. 3 conceptually illustrates a process 300 for receiving configuration data from a user and pushing it to host machines (e.g. local control planes executing in virtualization software). In some embodiments, the process 300 is performed by a controller implementing a management plane and a control plane. In some embodiments, certain operations are performed by a set of management plane computers and other operations are performed by a separate set of central control plane controllers. The process begins (at 310) by receiving configuration data regarding logical entities, and firewall rules associated with logical entities, for which traffic data should be collected. In some embodiments, this configuration data is received at a management computer or module from a user through a user interface (e.g., 201) or representational state transfer (REST) calls. In embodiments separating the management function from the control plane, the traffic monitoring configuration data is forwarded to the central control plane controllers in a format understandable to the central control plane.

Once the modules or controllers implementing the central control plane receive the traffic monitoring configuration data, the process then computes (at 320) a span of the logical entities specified in the configuration data. The span of the logical entity in some embodiments is defined by the host machines and MFEs implementing the logical network to which the logical entities belong. The process also prepares (at 320) the configuration data received from the user for conversion into configuration data for configuring the host machines (or MFEs on the host machines) to implement the traffic flow data collection configuration. In some embodiments, the central control plane communicates with a local control plane in the host machines.

The process then pushes (at 330) the traffic monitoring configuration data to the host machines (e.g., local control planes in the host machines). In some embodiments, the configuration data is a modified set of configuration data used to communicate the configuration specified by the user to the host machines. In some embodiments, the configuration data is pushed only to those host machines identified in the span calculation. In other embodiments, the configuration data is pushed to all host machines along with the span calculation, for the individual host machines to implement or not, based on a local determination of whether the host machine is in the span. In some embodiments, each host machine executes a hypervisor (e.g., ESXi™, KVM, Hyper-V™ etc.) with its own local control plane and data plane.

Figure 4:
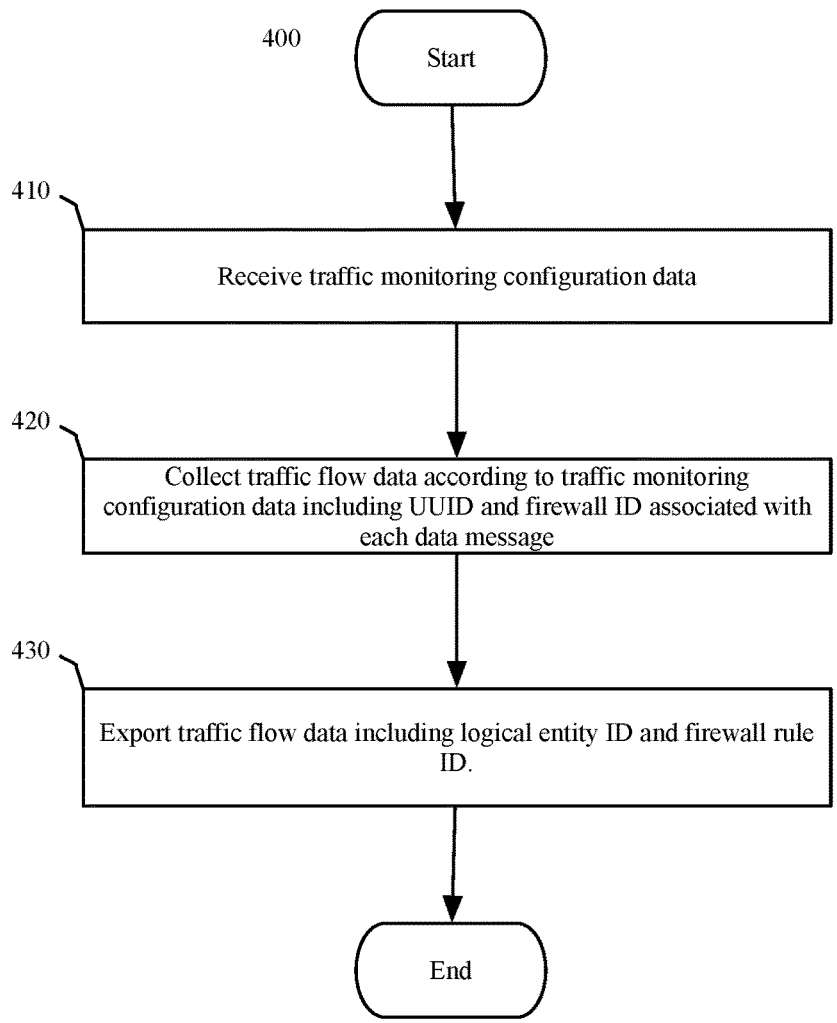
FIG. 4 conceptually illustrates a process for receiving configuration data, collecting traffic flow data, and exporting traffic flow data to collectors.

FIG. 4 conceptually illustrates a process 400 that is used to receive configuration data, collect traffic flow data, and export traffic flow data to collectors indicated by the configuration data. In some embodiments, the process 400 is performed by each host computer of a set of host computers. The host computers in some embodiments execute hypervisors or managed forwarding elements (virtual or software switches or routers executing on the host machine) that perform process 400. The process begins by receiving (at 410) traffic monitoring configuration data as described above in relation to FIG. 3. In some embodiments, the traffic configuration data specifies a set of logical entities (e.g., logical port, or logical forwarding elements) and related firewall rules for which traffic data is collected. The traffic configuration data in some embodiments is received at a local control plane from a central control plane. A local control plane uses the received configuration data to configure a managed forwarding element executing on the host machine (e.g., as part of the hypervisor) to implement the traffic data collection in accord with the traffic monitoring configuration data.

The process then collects (at 420) traffic flow data according to the traffic monitoring configuration data. For a specific data message, the collected data includes information that is of interest to a system administrator for monitoring traffic flows, including an identifier of the logical entity (e.g., a universally unique identifier (UUID) of a logical port) and a rule ID identifying a firewall rule used to process the data message. One of ordinary skill in the art will understand that the same information may not be included for all data messages (or data message flows) and that, for example, a logical entity UUID is omitted when the information of interest relates to the application of a firewall rule that is independent of the logical entity at which it is applied. In some embodiments, the local control plane collects traffic flow information from the data plane to construct the records (e.g., IPFIX records) that are exported to the traffic flow data collectors.

processed at particular logical entity, using (hitting) a particular firewall rule, etc.; or, a combination of multiple such conditions. In some embodiments, the formatted data is exported by the local control plane using a user datagram protocol (UDP).

Figure 5:
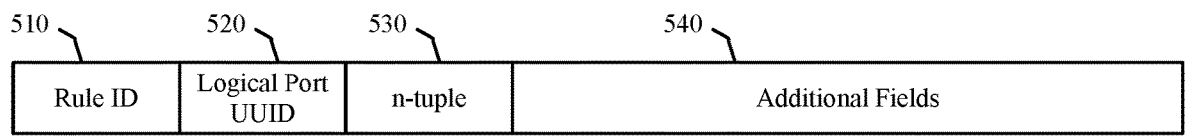
FIG. 5 conceptually illustrates a traffic flow data record of some embodiments.

FIG. 5 illustrates a traffic flow data record of some embodiments. The traffic flow data record includes a firewall rule ID field 510, a logical entity (e.g., a virtual interface (VIF)) UUID field 520, a set of fields 530 for a set of flow identifiers (e.g., an n-tuple comprising n separate data fields), and additional fields 540 that contain additional information. In some embodiments, the logical entity UUID field is not populated. The traffic flow data record in some embodiments is contained in a larger data format that includes multiple data sets as well as other information defining the content of the data sets.

Table 1 below provides a description of the fields identified in FIG. 5 including the identities of possible fields comprising the additional fields 540 and their contents. Multiple fields are included as part of the additional fields 540 in a data set of some embodiments.

| Name | Data Type | Semantics | Description |
|---|---|---|---|
| sourceIPv4Address | ipv4Address | identifier | The source IPv4 address. |
| destinationIPv4Address | ipv4Address | identifier | The destination IPv4 address. |
| sourceIPv6Address | ipv6Address | identifier | The source IPv6 address. |
| destinationIPv6Address | ipv6Address | identifier | The destination IPv6 address. |
| sourceTransportPort | unsigned16 | identifier | The source port identifier in the transport header. |
| destinationTransportPort | unsigned16 | identifier | The destination port identifier in the transport header. |
| octetDeltaCount | unsigned64 | deltaCounter | The number of octets since the previous report (if any) in incoming packets for this Flow at the Observation Point. The number of octets includes IP header(s) and IP payload. |
| packetDeltaCount | unsigned64 | deltaCounter | The number of incoming packets since the previous report (if any) for this Flow at the Observation Point. |
| flowStartSeconds | dateTimeSeconds | | The absolute timestamp of the first packet of this Flow. |
| flowEndSeconds | dateTimeSeconds | | The absolute timestamp of the last packet of this Flow. |
| protocolIdentifier | unsigned8 | identifier | The value of the protocol number in the IP packet header. |
| firewallEvent | unsigned8 | | Valid Values<br>1 - Flow Created<br>2 - Flow Deleted<br>3 - Flow Denied<br>4 - Flow Alert<br>5 - Flow Update |
| flowDirection | unsigned8 | | Valid Values (as applied to the filter as Observation point)<br>0x00: ingress flow to VM<br>0x01: egress flow from VM |
| icmpTypeIPv4 | unsigned8 | identifier | Type of the IPv4 ICMP message. |
| icmpCodeIPv4 | unsigned8 | identifier | Code of the IPv4 ICMP message. |
| icmpTypeIPv6 | unsigned8 | identifier | Type of the IPv6 ICMP message. |
| icmpCodeIPv6 | unsigned8 | identifier | Code of the IPv6 ICMP message. |
| ruleId | unsigned32 | identifier | Firewall Rule Id - Enterprise specific information element (IE). |
| vifUuid | string | identifier | VIF UUID - Enterprise specific IE that uniquely identifies the VIF. |

The process then exports (at 430) the collected traffic flow data including the logical entity identifier and the firewall rule identifier to the set of collectors identified in the traffic monitoring configuration data. In some embodiments, the traffic monitoring configuration data includes conditions upon which data is exported. The export condition may be a time interval; an amount of data collected; a threshold number of data messages processed for a particular flow, FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory (ROM) 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such as random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Figure 6:
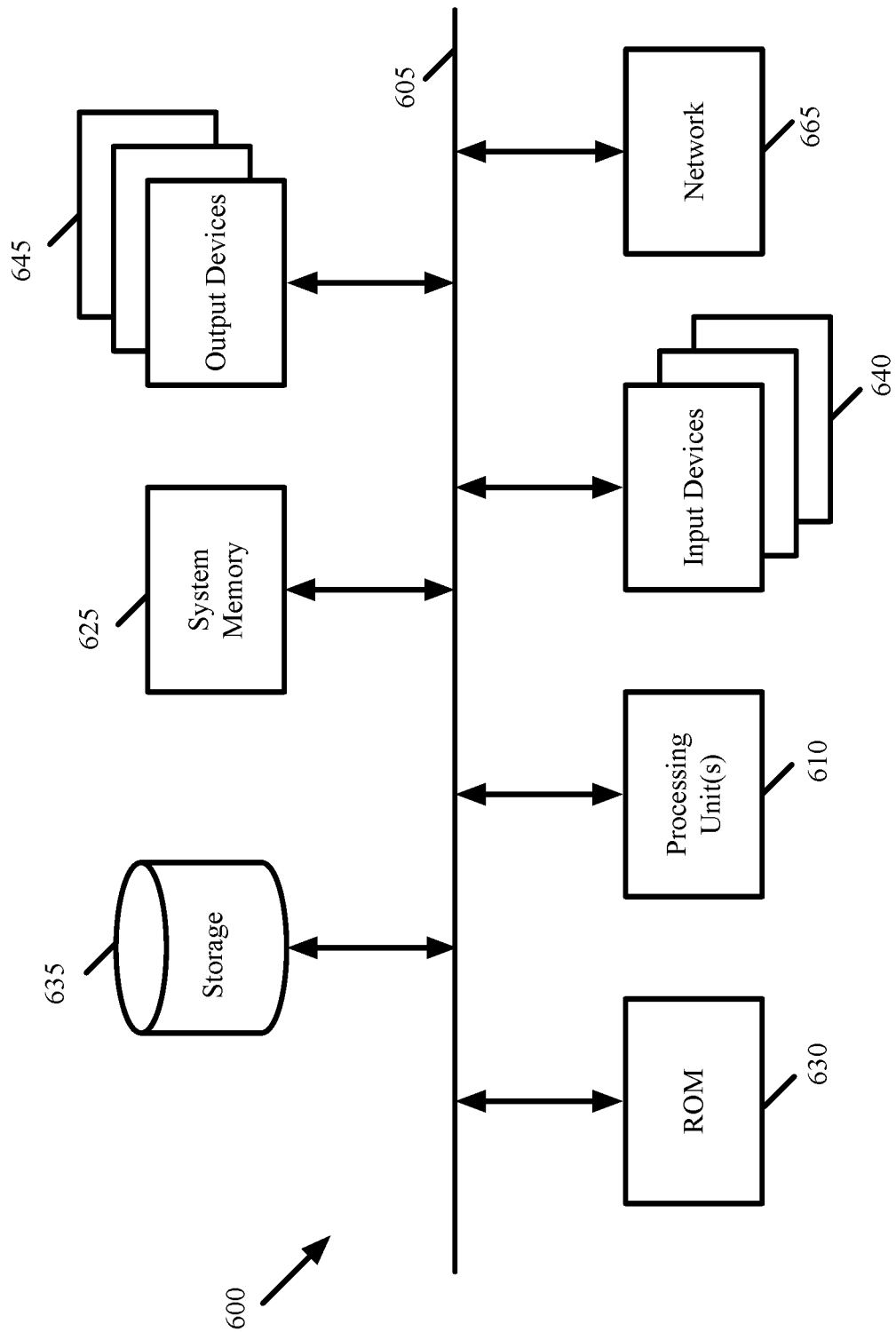
FIG. 6 conceptually illustrates an electronic system with which some embodiments of the invention are implemented.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3 and 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for collecting traffic flow data relating to logical ports of a logical forwarding element (LFE) of a logical network, the LFE spanning a plurality of host machines in a physical network and the logical network comprising a logical firewall for processing data messages received at the logical ports, the method comprising:
   at a first host machine in the plurality of host machines that, along with at least one other host machine in the plurality of host machines, implements the LFE:
      receiving traffic monitoring configuration data for the logical network indicating (i) a set of logical ports of the LFE for which to collect traffic flow data and (ii) a set of traffic flow data collectors associated with the set of logical ports;
      collecting data regarding a data message received at a particular logical port in the set of logical ports, the collected data comprising an identifier of a firewall rule applied to the data message at the first host machine; and
      exporting the collected data to at least one traffic flow data collector in the set of traffic flow data collectors in order to generate statistics from the collected data for the particular logical port, the generated statistics for analysis and display.

2. The method of claim 1, wherein the particular logical port is a first logical port, the logical network is a first logical network, the LFE is a first LFE, the first host machine, along with at least a second host machine in the plurality of host machines, is spanned by a second LFE of a second logical network, the set of logical ports is a first set of logical ports, the set of traffic flow data collectors is a first set of traffic flow data collectors, the data message is a first data message, and the applied firewall rule is a first applied firewall rule, the method further comprising:
   at the first host machine that, along with at least the second host machine, implements the second LFE:
      receiving traffic monitoring configuration data for the second logical network indicating (i) a second set of logical ports of the second LFE for which to collect traffic flow data and (ii) a second set of traffic flow data collectors associated with the second set of logical ports;
      collecting data regarding a second data message received at a second logical port in the second set of logical ports, the collected data regarding the second data message comprising an identifier for a second firewall rule applied to the second data message at the first host machine; and
      exporting the collected data regarding the second data message to at least one traffic flow data collector in the second set of traffic flow data collectors for analysis and display.

3. The method of claim 1, wherein the particular logical port is a first logical port, the set of traffic flow data collectors is a first set of traffic flow data collectors, the set of logical ports is a first set of logical ports, the LFE is a first LFE, the logical network comprises a second LFE that spans the first host machine and at least a second host machine in the plurality of host machines, the traffic monitoring configuration data is first traffic configuration data, the data message is a first data message, and the applied firewall rule is a first applied firewall rule, the method further comprising:
   at the first host machine that, along with at least the second host machine, implements the second LFE:
      receiving second traffic monitoring configuration data comprising (i) a second set of logical ports of the second LFE for which to collect traffic flow data and (ii) a second set of traffic flow data collectors associated with the second set of logical ports;
      collecting data regarding a second data message received at a second logical port in the second set of logical ports, the collected data regarding the second data message comprising an identifier of a second firewall rule applied to the second data message at the first host machine; and
      exporting the collected data regarding the second data message to at least one traffic flow data collector in the second set of traffic flow data collectors for analysis and display, the second set of flow collectors being different from the first set of flow collectors to balance a load among the sets of collectors.

4. The method of claim 1, wherein the traffic monitoring configuration data is received from a controller computer that (1) identifies that the span of the LFE of the logical network includes the first host machine, (2) identifies the set of logical ports of the LFE for which traffic flow data should be collected, (3) identifies the set of traffic flow data collectors associated with the set of logical ports and (4) generates the traffic monitoring configuration data for the first host machine.

5. The method of claim 1, wherein the set of logical ports is indicated by indicating the LFE in the logical network to which the set of logical ports belongs.

6. The method of claim 1, wherein the logical firewall of the logical network comprises a plurality of logical firewall rule sections, each firewall section comprising a set of logical firewall rules that applies to a group of logical ports, and the set of logical ports is a particular group of logical ports to which a particular logical firewall rule section applies.

7. The method of claim 1, wherein
   a local control plane of the first host machine receives the traffic monitoring configuration data, collects the data regarding the data message received at the particular logical port in the set of logical ports, and exports the collected data to the at least one traffic flow data collector in the set of traffic flow data collectors; and
   a managed forwarding element (MFE) executing on the first host machine implements the LFE along with at least one other MFE executing on the at least one other host machine, applies the firewall rule, and provides the data regarding the data message received at the particular logical port in the set of logical ports to the local control plane.

8. The method of claim 1, wherein
the traffic flow data is exported in internet protocol flow information export (IPFIX) format; and
the set of traffic flow data collectors is a set of IPFIX collectors.

9. The method of claim 1, wherein exporting the collected data comprises populating a set of fields based on the collected data, the set of fields defined by a particular template in a plurality of templates for exporting collected data.

10. The method of claim 1, wherein host machines in the plurality of host machines execute at least two different types of hypervisors and the set of traffic flow data collectors receive collected data from at least two host machines executing different types of hypervisors.

11. The method of claim 1, wherein each logical firewall rule of a set of logical firewall rules applied by the logical firewall specifies the particular logical port in the set of logical ports as a matching parameter for the firewall rule.

12. The method of claim 1, wherein
the LFE is a logical router and the particular logical port is a port of the logical router that connects to a logical switch, and
the logical router and the logical switch (i) each span the plurality of host machines and (ii) are each implemented by a plurality of managed forwarding elements executing on the plurality of host machines.

13. A non-transitory machine readable medium storing a program for execution by a set of processing units of a first host machine in a plurality of host machines in a physical network, the program for collecting traffic flow data relating to logical ports of a logical forwarding element (LFE) of a logical network, the LFE spanning the plurality of host machines and the logical network comprising a logical firewall for processing data messages received at the logical ports, the program comprising sets of instructions for:
at the first host machine that, along with at least one other host machine in the plurality of host machines, implements the LFE,
receiving traffic monitoring configuration data for the logical network indicating (i) a set of logical ports of the LFE for which to collect traffic flow data and (ii) a set of traffic flow data collectors associated with the set of logical ports;
collecting data regarding a data message received at a particular logical port in the set of logical ports, the collected data comprising an identifier of a firewall rule applied to the data message at the first host machine; and
exporting the collected data to at least one traffic flow data collector in the set of traffic flow data collectors in order to generate statistics from the collected data for the particular logical port, the generated statistics for analysis and display.

14. The non-transitory machine readable medium of claim 13, wherein the particular logical port is a first logical port, the logical network is a first logical network, the LFE is a first LFE, the first host machine, along with at least a second host machine in the plurality of host machines, is spanned by a second LFE of a second logical network, the set of logical ports is a first set of logical ports, the set of traffic flow data collectors is a first set of traffic flow data collectors, the data message is a first data message, and the applied firewall rule is a first applied firewall rule, the program further comprising sets of instructions for:
at the first host machine that, along with at least the second host machine, implements the second LFE:
receiving traffic monitoring configuration data for the second logical network indicating (i) a second set of logical ports of the second LFE for which to collect traffic flow data and (ii) a second set of traffic flow data collectors associated with the second set of logical ports;
collecting data regarding a second data message received at a second logical port in the second set of logical ports, the collected data regarding the second data message comprising an identifier for a second firewall rule applied to the second data message at the first host machine; and
exporting the collected data regarding the second data message to at least one traffic flow data collector in the second set of traffic flow data collectors for analysis and display.

15. The non-transitory machine readable medium of claim 13, wherein the particular logical port is a first logical port, the set of logical ports is a first set of logical ports, the set of traffic flow data collectors is a first set of traffic flow data collectors, the LFE is a first LFE, the logical network comprises a second LFE that spans the first host machine and at least a second host machine in the plurality of host machines, the traffic monitoring configuration data is first traffic configuration data, the data message is a first data message, and the applied firewall rule is a first applied firewall rule, the program further comprising sets of instructions for:
at the first host machine that, along with at least the second host machine, implements the second LFE:
receiving second traffic monitoring configuration data comprising (i) a second set of logical ports of the second LFE for which to collect traffic flow data and (ii) a second set of traffic flow data collectors associated with the second set of logical ports;
collecting data regarding a second data message received at a second logical port in the second set of logical ports, the collected data regarding the second data message comprising an identifier of a second firewall rule applied to the second data message at the first host machine; and
exporting the collected data regarding the second data message to at least one traffic flow data collector in the second set of traffic flow data collectors for analysis and display, the second set of flow collectors being different from the first set of flow collectors to balance a load among the sets of collectors.

16. The non-transitory machine readable medium of claim 13, wherein the traffic monitoring configuration data is received from a controller computer that (1) identifies that the span of the LFE of the logical network includes the first host machine, (2) identifies the set of logical ports of the LFE for which traffic flow data should be collected, (3) identifies the set of traffic flow data collectors associated with the set of logical ports and (4) generates the traffic monitoring configuration data for the first host machine.

17. The non-transitory machine readable medium of claim 13, wherein the set of logical ports is indicated by indicating the LFE in the logical network to which the set of logical ports belongs.

18. The non-transitory machine readable medium of claim 13, wherein a local control plane of the first host machine receives the traffic monitoring configuration data, collects the data regarding the data message received at the particular logical port in the set of logical ports, and exports the collected data to the at least one traffic flow data collector in the set of traffic flow data collectors; and a managed forwarding element (MFE) executing on the first host machine implements the LFE along with at least one other MFE executing on the at least one other host machine, applies the firewall rule, and provides the data regarding the data message received at the particular logical port in the set of logical ports to the local control plane.

19. The non-transitory machine readable medium of claim 13, wherein the traffic flow data is exported in internet protocol flow information export (IPFIX) format; and the set of traffic flow data collectors is a set of IPFIX collectors.

20. The non-transitory machine readable medium of claim 13, wherein host machines in the plurality of host machines execute at least two different types of hypervisors and the set of traffic flow data collectors receive collected data from at least two host machines executing different types of hypervisors.

21. The non-transitory machine readable medium of claim 13, wherein each logical firewall rule of a set of logical firewall rules applied by the logical firewall specifies the particular logical port in the set of logical ports as a matching parameter for the firewall rule.

* * * * *